(12) United States Patent
Höfer et al.

(10) Patent No.: US 9,648,983 B2
(45) Date of Patent: May 16, 2017

(54) HELICAL DYNAMIC FLOW THROUGH HEATER

(75) Inventors: Johann Höfer, St. Georgen (AT);
Andreas Pleschinger, Schleedorf (AT)

(73) Assignee: BLECKMANN GMBH & CO. KG, LAMPRECHTSHAUSEN (AT)

( * ) Notice: Subject to any disclaimer, the term of this patent is extended or adjusted under 35 U.S.C. 154(b) by 255 days.

(21) Appl. No.: 14/401,479

(22) PCT Filed: May 15, 2012

(86) PCT No.: PCT/EP2012/059042
§ 371 (c)(1),
(2), (4) Date: Mar. 20, 2015

(87) PCT Pub. No.: WO2013/170887
PCT Pub. Date: Nov. 21, 2013

(65) Prior Publication Data
US 2015/0182064 A1 Jul. 2, 2015

(51) Int. Cl.
*F24H 1/10* (2006.01)
*H05B 3/78* (2006.01)
*A47J 31/54* (2006.01)
*F24H 1/16* (2006.01)
*H05B 3/48* (2006.01)
*B23P 15/26* (2006.01)

(52) U.S. Cl.
CPC ............. *A47J 31/542* (2013.01); *B23P 15/26* (2013.01); *F24H 1/162* (2013.01); *H05B 3/48* (2013.01); *Y10T 29/49377* (2015.01)

(58) Field of Classification Search
None
See application file for complete search history.

(56) References Cited

U.S. PATENT DOCUMENTS

| | | | |
|---|---|---|---|
| 1,946,547 A | 2/1934 | Russell et al. | |
| 2,445,115 A | 7/1948 | Hanrahan | |
| 2,513,242 A | 6/1950 | Inman | |
| 2,687,626 A * | 8/1954 | Bartlowe | F25B 41/003 138/38 |
| 2,875,312 A * | 2/1959 | Norton | H05B 3/48 219/535 |
| 2,878,360 A | 3/1959 | Tavender et al. | |

(Continued)

FOREIGN PATENT DOCUMENTS

| | | |
|---|---|---|
| CH | 400397 A | 10/1965 |
| DE | 23 56 307 A1 | 5/1975 |

(Continued)

*Primary Examiner* — Thor Campbell
(74) *Attorney, Agent, or Firm* — Seed IP Law Group LLP

(57) ABSTRACT

A flow though heater device comprising a fluid tube carrying a fluid to be heated, a tubular heating element extending at least partially parallel and in thermal contact with the fluid tube, wherein the tubular heating element comprises a profiled casing tube and at least one heating coil mounted in a tubular portion of said profiled casing tube. The profiled casing tube further comprises at least one tab portion laterally protruding from the tubular portion and being wrapped around the fluid tube, wherein the assembly of the fluid tube and the tubular heating element has an approximately helical shape so that the tubular portion of the casing tube is positioned with respect to the helix radially inside of the fluid tube.

15 Claims, 11 Drawing Sheets

(56) References Cited

U.S. PATENT DOCUMENTS

| | | | | |
|---|---|---|---|---|
| 2,890,318 A | * | 6/1959 | Kruse | H05B 3/50 |
| | | | | 164/98 |
| 2,944,138 A | * | 7/1960 | Goff | F24H 3/002 |
| | | | | 165/183 |
| 3,711,681 A | * | 1/1973 | Leuschner | A47J 31/445 |
| | | | | 165/168 |
| 3,718,805 A | | 2/1973 | Posey | |
| 4,052,590 A | * | 10/1977 | Anderl | A47J 27/004 |
| | | | | 165/171 |
| 4,170,901 A | | 10/1979 | Conkle et al. | |
| 4,203,186 A | | 5/1980 | Horner | |
| 4,395,882 A | * | 8/1983 | Kast | F24J 2/402 |
| | | | | 60/527 |
| 4,417,133 A | | 11/1983 | Sanner | |
| 4,460,819 A | * | 7/1984 | Eugster | F24H 1/142 |
| | | | | 392/467 |
| 4,558,205 A | * | 12/1985 | Bleckmann | A47J 31/545 |
| | | | | 392/467 |
| 4,563,571 A | | 1/1986 | Koga et al. | |
| 4,693,302 A | | 9/1987 | Dodds | |
| 4,778,977 A | * | 10/1988 | Bleckman | A47J 31/542 |
| | | | | 138/115 |
| 4,792,661 A | * | 12/1988 | Schmidtchen | F24H 1/142 |
| | | | | 138/33 |
| 4,825,042 A | * | 4/1989 | Hauslein | A47J 31/545 |
| | | | | 392/467 |
| 4,904,845 A | * | 2/1990 | Wonka | A47J 31/542 |
| | | | | 392/467 |
| 5,367,607 A | * | 11/1994 | Hufnagl | A47J 31/36 |
| | | | | 392/397 |
| 5,422,459 A | * | 6/1995 | Zhou | H05B 3/72 |
| | | | | 219/465.1 |
| 5,523,550 A | | 6/1996 | Kimura | |
| 5,949,958 A | | 9/1999 | Naperkowski et al. | |
| 6,098,666 A | * | 8/2000 | Wells | F16L 11/22 |
| | | | | 138/115 |
| 6,459,854 B1 | | 10/2002 | Yoakim et al. | |
| 6,701,068 B2 | * | 3/2004 | Lin | F24H 1/142 |
| | | | | 392/465 |
| 6,724,985 B2 | * | 4/2004 | Matsunaga | F24H 1/162 |
| | | | | 219/530 |
| 6,943,325 B2 | | 9/2005 | Pittman et al. | |
| 6,967,315 B2 | | 11/2005 | Centanni et al. | |
| 7,021,372 B2 | * | 4/2006 | Pickard | F24D 3/141 |
| | | | | 165/168 |
| 7,286,752 B2 | | 10/2007 | Gourand | |
| 7,920,779 B2 | | 4/2011 | Shirai et al. | |
| 8,590,812 B2 | | 11/2013 | Wurz | |
| 2004/0057709 A1 | | 3/2004 | Leary et al. | |
| 2007/0012685 A1 | | 1/2007 | Gourand | |
| 2009/0103908 A1 | | 4/2009 | Kono et al. | |
| 2009/0154909 A1 | | 6/2009 | Meyer | |
| 2009/0310951 A1 | * | 12/2009 | Capraro | A47J 31/542 |
| | | | | 392/465 |
| 2010/0046934 A1 | | 2/2010 | Johnson et al. | |
| 2010/0232772 A1 | | 9/2010 | Chiu et al. | |
| 2011/0036544 A1 | | 2/2011 | Shirai et al. | |
| 2011/0297360 A1 | | 12/2011 | Perry | |
| 2014/0233931 A1 | * | 8/2014 | Capraro | A47J 31/542 |
| | | | | 392/488 |
| 2015/0182064 A1 | * | 7/2015 | Hofer | A47J 31/542 |
| | | | | 392/481 |

FOREIGN PATENT DOCUMENTS

| | | |
|---|---|---|
| DE | 75 36 932 U | 5/1976 |
| DE | 77 26 863 U | 12/1977 |
| DE | 27 43 333 A1 | 3/1979 |
| DE | 29 03 743 A1 | 8/1980 |
| DE | 29 42 523 A1 | 4/1981 |
| DE | 35 42 507 A1 | 6/1987 |
| DE | 42 12 074 C1 | 4/1993 |
| DE | 4332826 A1 | 3/1995 |
| DE | 195 23 047 C1 | 11/1996 |
| DE | 19726245 A1 | 1/1998 |
| DE | 19852888 A1 | 5/2000 |
| DE | 103 22 034 A1 | 12/2004 |
| DE | 10 2005 050 203 A1 | 4/2007 |
| DE | 202007005738 U1 | 7/2007 |
| DE | 60 2004 004 528 T2 | 10/2007 |
| DE | 10 2007 034 370 A1 | 1/2009 |
| EP | 0 303 131 A1 | 2/1989 |
| EP | 0 445 313 A1 | 9/1991 |
| EP | 0 485 211 A1 | 5/1992 |
| EP | 1 321 708 A2 | 6/2003 |
| EP | 1 076 503 B1 | 9/2003 |
| EP | 2 044 869 A1 | 4/2009 |
| FR | 2 855 359 A1 | 11/2004 |
| FR | 2 891 688 A1 | 4/2007 |
| GB | 1 494 536 | 12/1977 |
| JP | 56-116608 A | 9/1981 |
| WO | 2006/129511 A1 | 12/2006 |
| WO | 2007039683 A1 | 4/2007 |
| WO | 2010055472 A2 | 5/2010 |

* cited by examiner

HELICAL DYNAMIC FLOW THROUGH HEATER

BACKGROUND

Technical Field

The present invention relates to flow through heater devices as used for example in coffee machines or other devices for preparing hot beverages and the like. In particular, the invention relates to a dynamic flow through heater having a helical shape, and a method of manufacturing such a helical flow though heater.

Description of the Related Art

In hot beverage preparation apparatuses like coffee machines, for example, electrical heating devices having an electrical power of several hundred watts up to more than 1 or 2 kW are used to produce hot water or steam for preparing a beverage. Controlling of such high heating power in order to produce a certain amount or a certain flow of water or steam having a specific temperature necessary to satisfy predetermined quality requirements is a challenging problem. One type of a common heating device comprises a kind of electrical heated massive thermo block having a relative heavy body made of aluminum, for example, through which the fluid is guided and which provides a high thermal inertia so that controlling the temperature of the fluid is relative easy because of the slow thermal reaction of the heating device in spite of the high electrical power. This device provides a uniform heat flow distribution and a relative constant fluid temperature when a slow switching controller is used for controlling the electrical heating power. However, the high thermal inertia results in a long heating-up period when activating the beverage preparation apparatus so that usability of the apparatus is affected. If, on the other hand, the heating device is operated in a stand-by mode so as to hold a predetermined higher temperature and shorten the heating-up period, then energy is wasted. Furthermore, a lot of heat energy is provided to the thermal block during the heating-up period and lost useless when the apparatus is switched of and cools down. Moreover, it is necessary to design a whole new special thermo block heating device for each application according to the requirements with respect to heating power, specific thermal load of surfaces and the like.

From DE 3542507 an electrical flow though heater is known, having a relative small thermal inertia and comprising an extruded aluminum profile having two adjacent channels. One channel receives a usual tubular heating element, while the other channel receives a stainless steel tube for carrying the water to be heated. The assembly of the extruded profile, the tubular heating element and the water tube is bent in direction of the smaller dimension of the cross-section of the extruded profile and wound to a helical shape so that the heating tube and the water tube are positioned on the same cylindrical surface. Thus, a relative compact heating device having a low thermal inertia is provided so that waste of energy and a heating-up period are reduced. That kind of heating device is called a dynamic flow through heater because of its fast thermal response that enables a short heating-up period and a dynamic temperature control.

However, manufacturing the heating device shown in DE 3542507 is laborious and expensive because first a complete tubular heating element has to be produced, and then the heating element and the water tube have to be slipped into the channels of the extruded profile before bending the assembly to the helical shape. Furthermore, the heat transfer from the heating coil of the tubular heating element to the water tube is impeded because the heat must traverse a high number of walls and interfaces, i.e., the interfaces arranged on the way from the heat-conductive insulating material (usually magnesium oxide) inside the tubular heating element to the wall of the heating element, the body of the extruded profile, and the wall of the water tube. Additionally, the surface contact between the tubular heating element and the extruded profile and between the extruded profile and the water tube is affected by the deformation of the profile and the tubes during bending to the helical shape. Hence, the surface contact and the heat transfer between these components may be reduced. Moreover, while heating up or cooling down, a different thermal expansion of the tubular heating element and the water tube leads to a torsional mechanical load and deformation during operation which can result in cracks created in the extruded profile or the tubular heating element. In order to avoid shortening of the operating life caused by that mechanical load, wall thicknesses have to be increased which is in turn undesired because thermal inertia and costs will be increased, too.

It is an object of the present invention to overcome the deficiencies of the prior art and to provide a dynamic flow through heater device having a very low thermal inertia and small dimensions while providing high heating power and an optimized heat transfer to the fluid to be heated. Another object is to provide a dynamic flow through heater device which is inexpensive and easier to produce. Another object is to provide a dynamic flow through heater device that can be easily resized in design in order to adapt it to varying application requirements. Moreover, it is an object of the present invention to provide a method of producing such an optimized dynamic flow through heater device in a reliable and cost efficient way.

BRIEF SUMMARY

In accordance with the invention, that objects are solved by a flow though heater device according to claim 1 and a method of producing such a flow though heater device according claim 10 of the present invention. The dependent claims refer to advantageous further developments of the invention.

In a first aspect, the invention provides a flow though heater device, comprising a fluid tube carrying a fluid to be heated, a tubular heating element extending at least partially parallel and in thermal contact with the fluid tube, wherein the tubular heating element comprises a profiled casing tube and at least one heating coil mounted in a tubular portion of said profiled casing tube. The profiled casing tube further comprises at least one tab portion laterally protruding from the tubular portion and being wrapped around the fluid tube, wherein the assembly of the fluid tube and the tubular heating element has an approximately helical shape so that the tubular portion of the casing tube is positioned with respect to the helix radially inside of the fluid tube.

The flow though heater device according to the present invention is a dynamic flow through heater having substantial advantages over common heating devices and has a very low thermal inertia resulting in very a short heating-up period, a short control response time, and low energy losses because of the small amount of energy stored in the body of the heating device. Therefore, it is also not necessary to operate the heating device in a stand-by mode with an increased temperature and stand-by energy losses are reduced while a high ease of use with short waiting periods is achieved. Furthermore, the device is very compact and can be easily adapted to dimensional requirements by varying the diameter and/or the length of the helix, or by providing the helix with a non-circular shape such as an elliptical shape, for example. Furthermore, the flow though heater device of the invention can be easily adapted to differing requirements with respect to heating power, heated surface area of the fluid tube, and specific thermal area loading, by scaling the length of the helical wound tubes and the corresponding heating power of the heating coil. To this, the same basic components can be produced with the same tools (extruding tools for the profiled casing tube for example) in different lengths, thus avoiding costly redesign of tools or produced components. With the dynamic flow through heater device of the invention It is easy to define an optimum ratio of tube lengths and heating power to optimize heating-up periods and avoid bubble generation, for example, to comply with requirements of the specific application.

Using a profiled casing tube, preferably an extruded aluminum profile with a good thermal conductivity, having one channel for directly receiving a heating unit comprising at least one heating coil reduces number of components and improves heat transfer to the water tube. The at least one heating coil is mounted directly in the profiled casing tube filled with a heat-conductive insulation material (preferably siliconized magnesium oxide) so that an additional casing tube of a tubular heating element is omitted and heat transfer is improved by a reduced number of interfaces the heat has to traverse, and by avoiding reduced heat transfer resulting from a reduction of surface contact between the additional wall of the tubular heating element and the profiled casing tube. Additionally, costs are reduced by using a reduced number of components assembled in a reduced number of easier production steps.

Bending the assembly of the profiled casing tube and the water tube such that the tubular portion of the casing tube is positioned with respect to the helix radially inside of the fluid tube avoids any torsional deformation of the assembly during heating up and cooling down in operation. Thus, wall thickness of the water tube and the profiled casing tube can be reduced without the risk of creating cracks so that operation life is elongated while a very compact dynamic flow through heater having a very low thermal inertia is achieved. In particular, during fast heating-up the tab portion and the tubular portion of the profiled casing tube positioned in the helix radial inside of the water tube is mechanically loaded by a fast compression because of the faster expansion of the heated tubular casing tube with a high temperature gradient. On the other hand, during slow cooling-down when the electric power of the heating coil is switched off, the profiled casing tube is mechanically loaded by a relatively slow tensile load. This arrangement of the components within the helical shaped flow though heater device results in a reduced risk of crack creation in the profiled casing tube of the tubular heating element so that operating life is elongated and wall thickness of the profiled casing tube can be reduced thereby achieving a lower thermal inertia and reducing costs.

The dynamic flow though heater device of the invention can be used for heating water or for producing steam.

According to a further development of the invention, the fluid tube may have a non-circular cross-section, in particular an elliptical cross-section. Thus, the ratio of heated fluid surface to flow cross-section can be increased.

According to another independent aspect of the invention, a heat-conductive means may be arranged between the fluid tube and the casing tube. The heat-conductive means may comprise any kind of material suitable to resist the temperatures during operation and improving the heat transfer by displacing air situated between the casing tube and the fluid tube. Such a heat-conductive means may comprise a high-temperature heat-conductive paste, or preferably solder providing a soldered connection between the fluid tube and the casing tube. A soldered connection provides for a reliable and very good heat transfer from the casing tube to the fluid tube.

According to another independent aspect of the invention, the tubular portion may comprise end portions protruding the tab portion in a longitudinal direction of the casing tube. Thus, insulating ceramic beads for holding the heating coil and the heat-conductive insulation material within the tubular portion of the heating element can be reliably mounted in the end portions by press forming the end portions, for example, while the connection between the casing tube and the insulating beads is not affected by any deformations of the casing tube, in particular the tab portion of the same, occurring in a later stage of manufacturing or caused by thermo-mechanical loads during the operation of the heater device.

Furthermore, it is another independent advantageous option that the circumference of the fluid tube is approximately completely surrounded by the casing tube, i.e., by the tubular portion and the at least one tab portion wrapped around the fluid tube. If one tab portion is used, it is wrapped around the fluid tube so that the edge of the tab portion is positioned at or near the tubular portion of the casing tube. In this way, the heat transfer surface is maximized and a reliable connection between the casing tube of the tubular heating element and the fluid tube is achieved. If two tab portions are used, they may be symmetric and may be wrapped around the fluid tube so that their edges are positioned adjacent to each other and opposite the tubular portion of the casing tube. This further improves heat transfer to the fluid tube because of the two ways of heat flow via the two tab portions to the surface of the fluid tube facing away from the tubular portion of the profiled casing tube. Thus, a more uniform heat flow distribution over the circumference of the fluid tube can be achieved. A relative small slit that may preferably remain between the edge of the tab portion and the tubular portion of the casing tube or between the edges of the two tab portions allows supplying a solder between the fluid tube and the casing tube for soldering the same and providing for a reliable and very good heat transfer, after the assembly has been bent to the helical shape. Moreover, such a slit advantageously allows compensation motions of the tab portion edge with respect to the tubular portion or with respect to the edge of another tab portion during bending of the assembly, and thus, avoids reduction of surface contact between the casing tube and the fluid tube caused by any deformations during bending.

According to a further independent aspect of the invention, the profiled casing tube may comprise an extruded aluminum profile and the fluid tube may comprise a stainless steel tube. Aluminum profiles are cost-efficient and can be produced in a desired cross-sectional shape, i.e., in the form of a tubular portion having a laterally protruding tab portion, for example. Furthermore, a casing tube made of aluminum is a preferred component for manufacturing a tubular heating element because of its formability and its good heat-conductivity.

According to a completely independent aspect of the present invention, there is provided U-shaped mounting bracket which may be arranged inside the helical assembly of the fluid tube and the tubular heating element of a helical flow through heater device and has hook-like end portions holding at least one winding of the helical assembly for mounting the device in an apparatus, in particular in a beverage preparation apparatus such as a coffee machine. The mounting bracket may further comprise at least one holder holding a thermal safety device so that it abuts on the radial inner side of the helical assembly of the fluid tube and the tubular heating element. The thermal safety device may comprise a thermal fuse for interrupting the supply of electric power to the heating coil in case of exceeding a predetermined temperature threshold. The thermal safety device may be pre-mounted to the bracket so that mounting of the helical flow through heater device in a beverage preparation apparatus by means of this bracket will automatically result in a correct placement and reliable installation of the necessary safety device.

According to another aspect, the present invention provides a beverage preparation apparatus, in particular a coffee machine, comprising a flow though heater device as described above.

In another aspect, the present invention provides a method of producing a flow though heater device, comprising the steps of preparing a profiled casing tube, in particular an extruded aluminum profile, having a tubular portion and at least one tap portion laterally protruding from the tubular portion; placing within the tubular portion of the casing tube a heating unit comprising at least one heating coil and two insulating beads holding respective ends of the at least one heating coil; filling a heat-conductive insulation material, in particular a siliconized magnesium oxide powder, into the inside volume of the tubular portion between the insulating beads; forming the tubular portion to reduce the cross-sectional area of its inside volume and compact the heat-conductive insulation material, and further to provide the tubular portion adjacent to the at least one tab portion with an outer contour which in part is approximately complementary to the outer contour of a fluid tube for carrying a fluid to be heated; joining the fluid tube to the approximately complementary contour of the formed tubular portion adjacent to the at least one tab portion of the casing tube; wrapping the at least one tab portion around the fluid tube to approximately completely surround the circumference of the fluid tube; and bending the assembly of the formed casing tube and the fluid tube to an approximately helical shape so that the tubular portion of the casing tube is positioned with respect to the helix radially inside of the fluid tube.

This method enables a cost-efficient and easy production of an improved helical dynamic flow through heater in a reduced number of simple steps and with a reduced number of components.

According to an independent further development, the method of the invention may comprise a step of removing the tab portion at both end portions of the profiled casing tube. Such and portions are advantageous with respect to installation of the insulation beads of the heating unit.

According to another independent aspect, the method of the invention may further comprise the step of bending the end portions of the profiled casing tube so that their axes deviate from the axis of the remaining casing tube. This deviation of the axes provides for a greater distance of the end portions from the fluid tube exiting the tab portion wrapped around, in order to facilitate installation of connection pieces to the fluid tube and the heating unit.

According to another independent aspect, the method of the invention may further comprise the step of applying heat-conductive means onto the outer surface of the fluid tube or the corresponding surface of the casing tube. This step can be effected before joining the fluid tube to formed tubular portion of the casing tube so that a good thermal contact is provided by displacing any air which might otherwise remain between the components and might affect heat transfer.

In a preferred embodiment of the invention, the heat-conductive means may comprise a solder applied together with a soldering flux, wherein the method may further comprise soldering the fluid tube and the casing tube after the bending step by applying heat to the assembly of the casing tube and the fluid tube. This represents a very simple and reliable way of forming a soldering connection between the fluid tube and the casing tube simultaneously resulting in a very good total heat transfer from the heating coil to the fluid tube.

In another advantageous and independent embodiment, the method of the invention may comprise the step of applying a soldering flux onto the outer surface of the fluid tube or the corresponding surface of the casing tube, and the step of soldering the fluid tube and the casing tube after the bending step by applying heat to the assembly of the casing tube and the fluid tube and supplying solder to a slit remaining between the tab portion and the tubular portion of the casing tube. With this alternative way of forming a soldering connection between the fluid tube and the casing tube, bubbles of air or soldering flux remaining between the fluid tube and the casing tube can be avoided, while the resulting solder layer is thinner because of the omitted preformed solder layers on the components. Hence, a better heat transfer can be achieved.

BRIEF DESCRIPTION OF THE DRAWINGS

In the following, further advantages and embodiments of the inventive method and apparatus are described in conjunction with the attached drawings. Thereby, the expressions left, right, below and above are referred to the drawings in an orientation of the drawings which allows the normal reading of the reference numbers, but do not necessarily define a position or orientation of the features or components with respect to manufacturing or operation, unless explicitly stated.

DETAILED DESCRIPTION

Figure 19:
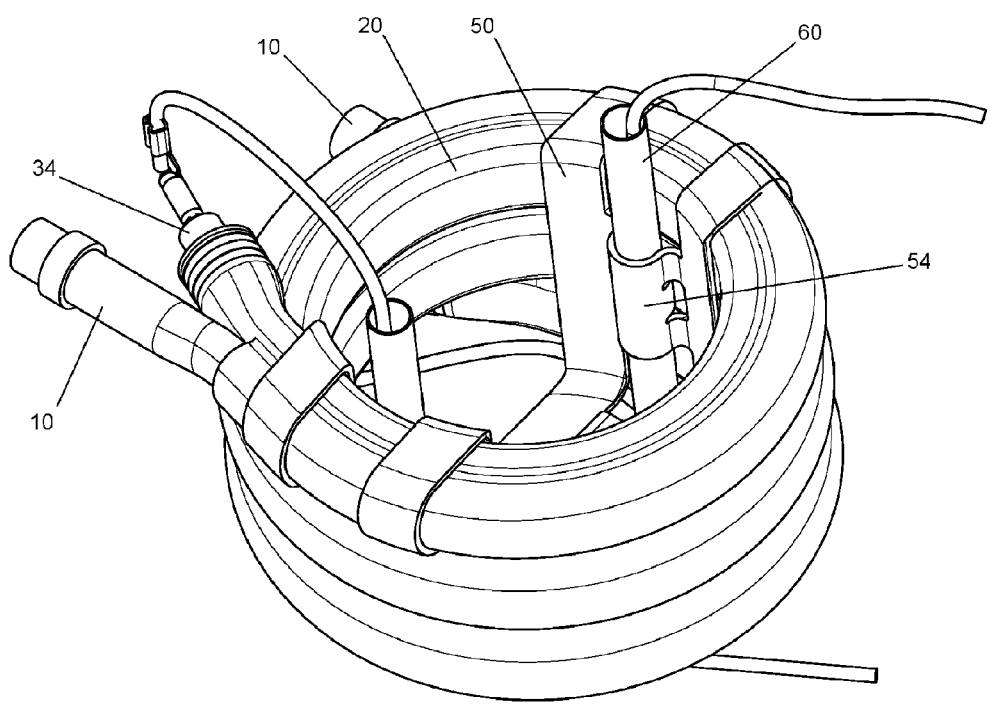
FIG. 19 is a perspective view of a flow through heater of the first embodiment of the present invention with mounted connection pieces.

A helical dynamic flow through heater according to the Invention as shown in the perspective view of FIG. 19 is designed to be used in a beverage preparation apparatus such as a coffee machine, for example. It has to be noted that the length (helical length and/or number of helical windings) of the flow through heater device of the present invention may vary depending on the intended application. In order to facilitate illustration, the drawing figures do not always show the preferred length ratios of the components and have to be construed in an illustrative manner.

Figure 1:
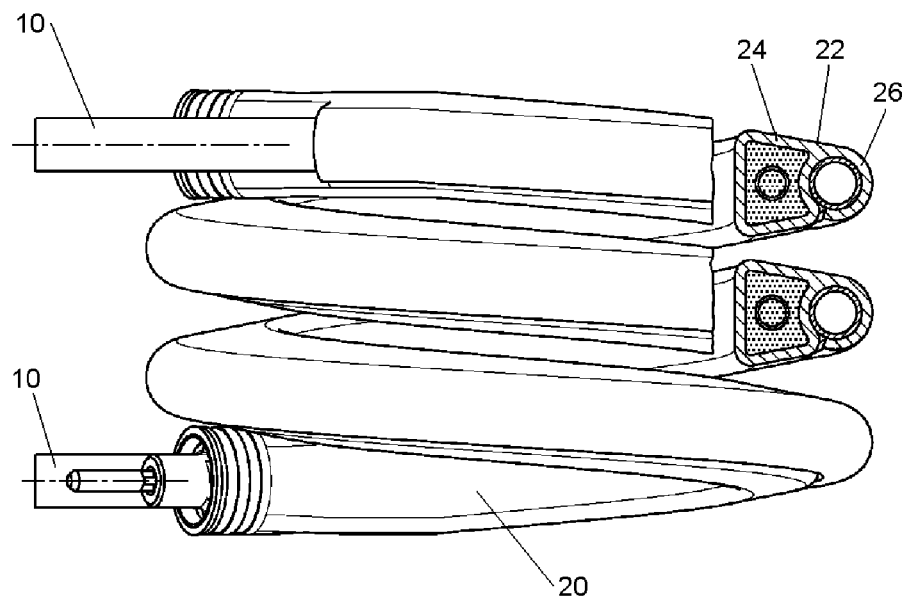
FIG. 1 is a side view of a helical assembly of a fluid tube and a tubular heating element according to a first embodiment of the present invention.
Figure 10:
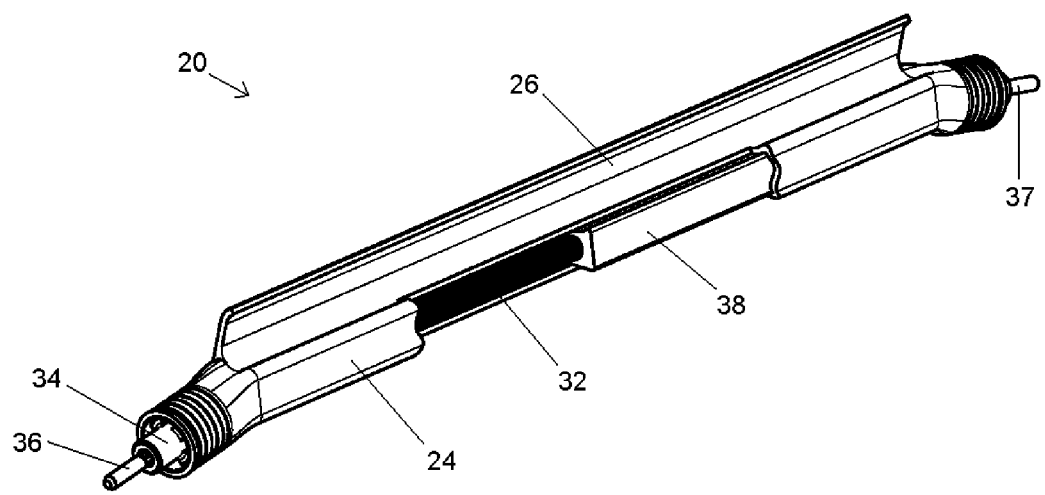
FIG. 10 is a perspective view of a pre-mounted tubular heating element according to the first embodiment of the invention, shown with the casing tube partially cut open.

FIG. 1 is a perspective view of a helical assembly of a fluid tube 10 and a tubular heating element 20 of the flow through heater according to a first embodiment of the invention. The tubular heating element 20, which is shown in FIG. 10 in more detail in a state before joining it with the fluid tube 10, is arranged adjacent to and in thermal contact with the fluid tube 10 in an approximately helical shape.

In alternative embodiments of the invention, the helical shape of the heater device may be a circular helix or an elliptical helix, or even a helix having an otherwise deformed cross section, as may be required by the space available for mounting the heater device in a beverage preparation apparatus, for example.

The fluid tube may be made of any material suitable to carry a fluid to be heated such as water or steam, and preferably is made of stainless steel which is a preferred material in the field of food technology because of its advantageous properties such as resistance to aggressive fluids and neutrality with respect to foods. The fluid tube 10 may be a stainless steel tube having a circular cross-section and a diameter preferably in the range of 4 to 8 mm, for example. The wall thickness of the fluid tube 10 may be in the range of 0.3 to 0.6 mm, preferably about 0.4 mm, for example. A thin wall provides for a low thermal resistance of the fluid tube 10 with respect to the heat to be transferred to the fluid flowing inside the fluid tube 10, while stainless steel provides for sufficient strength and stability of the fluid tube 10 during manufacturing (bending) and operation (thermal expansion loads) of the flow through heater.

As shown in FIGS. 7 to 10 in more detail, the tubular heating element according to the first embodiment comprises a profiled casing tube 22 and a heating unit 30 mounted in a tubular portion 24 of the casing tube 22. The tubular portion 24 has an inner diameter preferably in the range of 5 to 8 mm. The wall thickness of the tubular portion 24 and the tab portion 26 of the profiled casing tube 22 may be preferably in the range of 0.8 to 1.5 mm, for example. A thinner wall results in desired less thermal inertia, while a thicker wall results in a better heat distribution, so that a compromise has to be found. Optionally, the wall thickness of the tubular portion 24 may be different from that of the tab portion. Alternatively, it is also possible that the wall thickness of the tubular portion 24 varies along the circumference, or the wall thickness of the tab portion 26 varies from its root at the tubular portion to its edge. For example, wall thickness of the tubular portion 24 may be thinner in the fluid tube contact area, and wall thickness of the tab portion 26 may decrease from its root to its edge. In this manner, it is possible to further minimize thermal inertia of the flow through heater while simultaneously maximizing heat distribution around and heat transfer to the fluid tube 10.

The heating unit 30 comprises a heating coil 32 hold by two insulating beads 34, 35 having contact terminals 36, 37 for electrical connecting the heating coil to an electric power source. The insulating beads are preferably made of a ceramic material and are mounted within the end portions 25 of the tubular portion 24 of the casing tube 22 so that the heating coil 32 is arranged insulated in the hermetically closed volume inside the tubular portion 24 between the insulation beads 34, 35 which is filled with a compacted heat-conductive insulating material 38. The heat-conductive insulating material 38 preferably comprises siliconized magnesium oxide (MgO) as commonly used in manufacturing of tubular heating elements, providing for a good heat transfer from the heating coil 32 to casing tube 22.

The profiled casing tube 22 is preferable made of an extruded aluminum profile which has a high thermal conductivity and can be easily produced is a desired shape at low costs. However, other materials may be suitable, too, for forming the profiled casing tube, such as copper or brass or other alloys, for example.

Figure 7:
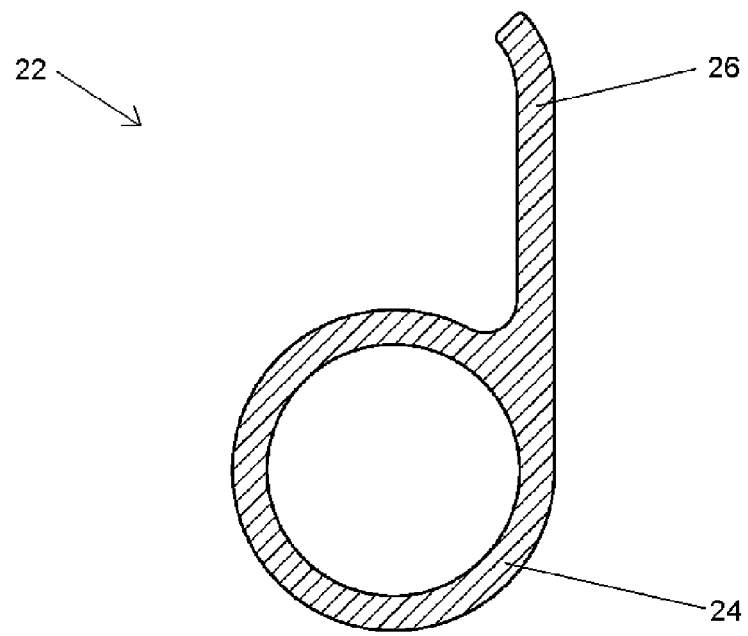
FIG. 7 shows a cross-section of a profiled casing tube of the tubular heating element according to the first embodiment of the invention.
Figure 8:
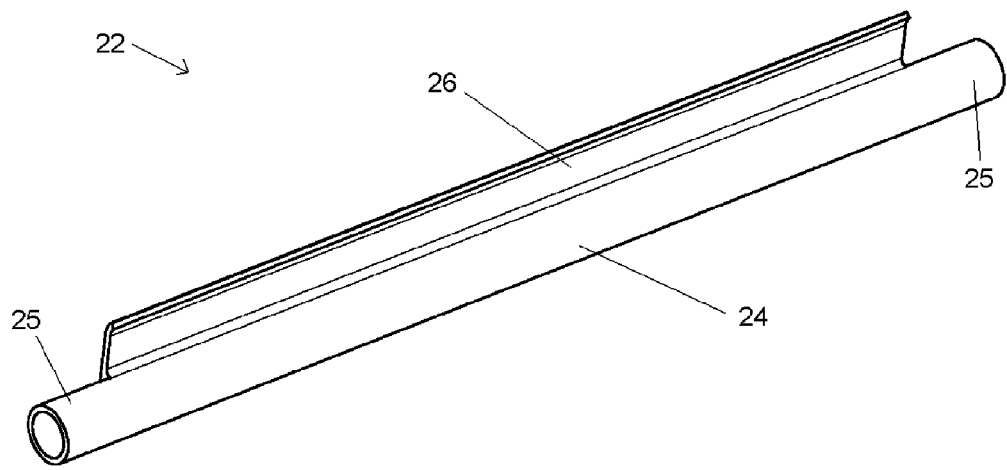
FIG. 8 is a perspective view of the profiled casing tube of FIG. 7.
Figure 9:
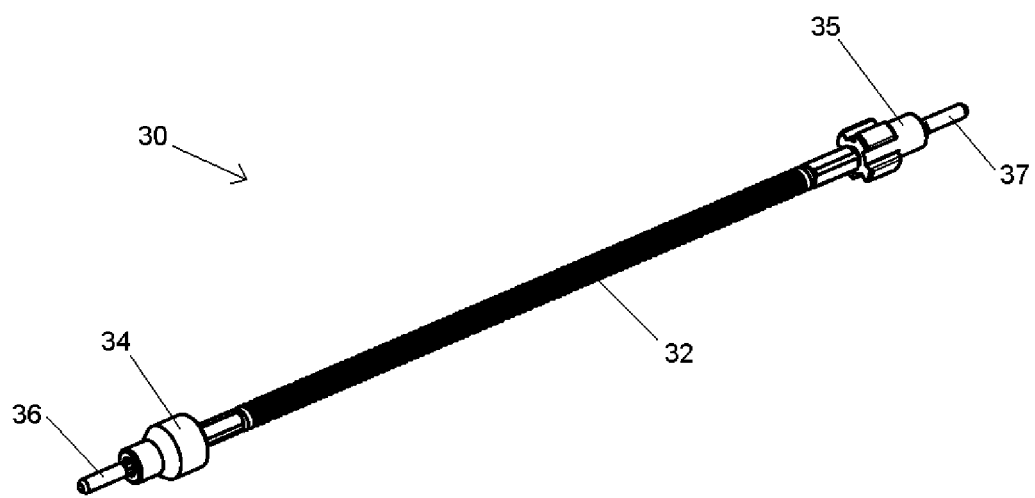
FIG. 9 is a perspective view of a heating unit to be mounted in a profiled casing tube according to the first embodiment of the present invention.

As shown in FIG. 7, representing a cross-section of the prefabricated casing tube 22, the profiled casing tube 22 of the tubular heating element 20 comprises a tubular portion 24 for receiving the heating unit 30, and a tab portion 26 laterally protruding from the tubular portion 24. The tab portion 26 may have a slightly curved edge portion (as shown in FIG. 7) which corresponds to an outer radius of the fluid tube for which it is intended, so that wrapping the tab portion 26 around the fluid tube is facilitated. Moreover, the tab portion 26 may extend over the whole length of the tubular portion 24 of the casing tube 22, however, it is preferred that the tab portion is removed at the end portions 25 of the tubular portion 24 as shown in FIG. 8 representing a perspective view of the profiled casing tube 22. Removing the tab portion 26 from the end portions 25 is advantageous with respect to the mounting of the insulation beads 34, 35 of the heating unit 30 because the tab portion 26 would impede press forming the end portions 25 around the insulation beads 34, 35.

Figure 2:
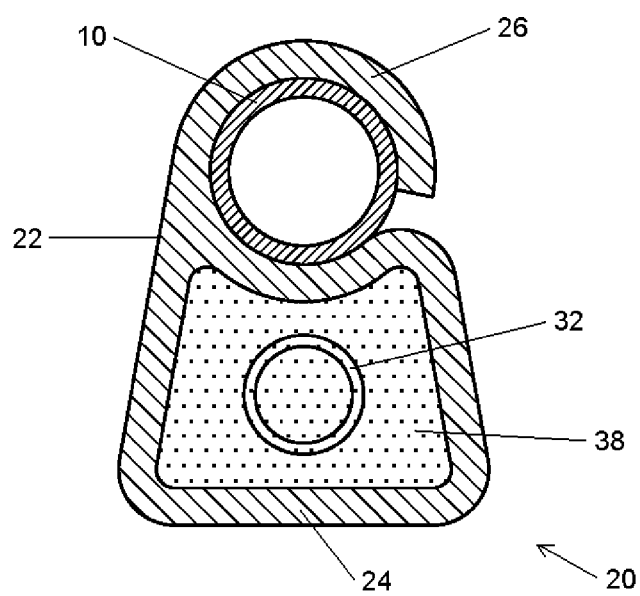
FIG. 2 shows a cross-section of the assembly of the fluid tube and the tubular heating element according to the first embodiment of the present invention.
Figure 11:
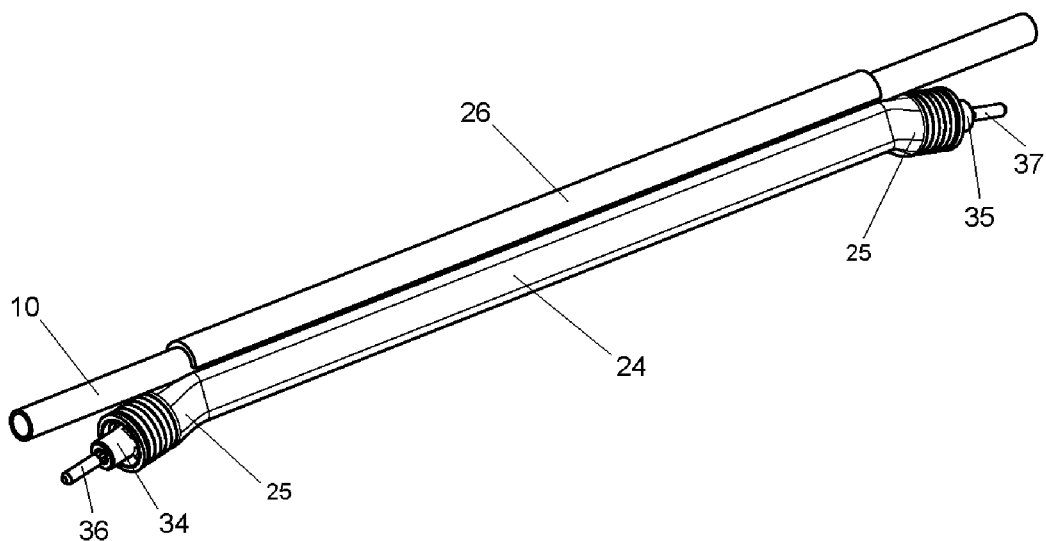
FIG. 11 is a perspective view of an assembly of the fluid tube and the tubular heating element according to the first embodiment of the present invention before bending it to a helical shape.

As shown in FIGS. 1, 2 and 11, the tab portion 26 of the casing tube 22 is wrapped around the fluid tube 10 and fixes the fluid tube 10 to the tubular heating element 20. In order to provide a good heat transfer from the heating element 20 to circumference of the fluid tube 10, the length of tab portion 26 is dimensioned such that it extends around the circumference of the fluid tube 10 until it reaches or nearly reaches the tubular portion 24. Thus, the circumference of the fluid tube 10 is approximately completely surrounded by the tab portion 26 and the tubular portion 24 of the casing tube 22 of the tubular heating element 20. In this manner, the heat produced by the heating element 20 is uniformly distributed over the circumference of the fluid tube so as to provide for a relative uniform surface load of heat and a high heating performance.

As shown in FIG. 1, the helical shape of the assembly of the fluid tube 10 and the tubular heating element 20 is arranged such that the tubular portion 24 of the casing tube 22 of the heating element 20 is positioned with respect to the helix radially inside of the fluid tube 10. In other words, the center line of the fluid tube 10 and the center line of the tubular portion 24 each represent helical lines having different helix diameters but the same pitch so that the helix of the tubular portion 24 is positioned inside of and parallel to the helix of the fluid tube 10. Considering a longitudinal section through the helix, the center of the tubular portion 24 is positioned on a radial line of the helix extending from the axis of the helix to the center of the fluid tube 10. This is advantageous in that thermal expansions or contractions during heating-up or cooling-down does not lead to any torsional loads and deformations acting on the casing tube 22. Such repeated deformations occurring in operation may in turn lead to creation of cracks in the casing tube 22 resulting in a shortened operation life of the flow through heater. Arranging the tubular portion 24 of the heating element approximately radially inside of the fluid tube provides that during fast heating-up the thermal expansion of the tubular portion 24 results in a compressive load acting on the tubular portion 24 and the tab portion 26. A fast and strong compressive load does not lead to creation of cracks in the tubular portion 24 and the tab portion 26, in contrast to a fast and strong tensile load which would occur during heating-up if the tubular portion 24 would be positioned radially outside of the fluid tube 10. When, on the other hand, the heating unit 30 is switched off and the fluid heater cools down with a comparable slow rate, only a slow and low tensile load may be acting on the tubular portion 24 and the tab portion 26, if at all.

Optionally, a heat-conductive means may be arranged between the fluid tube and the casing tube in order to decrease thermal resistance and improve heat transfer from the tubular heating element 20 to the fluid tube 10. This heat-conductive means can be any kind of material sandwiched between the circumference of the fluid tube 10 and the surface portions of the casing tube 22 facing the fluid tube 10 and suitable to stay in place and withstand high temperatures occurring in operation, such as a heat-conductive paste. Preferably, a solder is used as heat-conductive means since a soldered connection between the fluid tube and the casing tube has an excellent durability provides a very good heat transfer, and furthermore strengthens the assembly of the fluid tube 10 and the heating element 20.

As a further optional improvement of the helical dynamic flow through heater of the invention, the tubular portion 24 comprises end portions 25 protruding the tab portion 26 in a longitudinal direction of the casing tube, as in particular shown in FIGS. 8 and 11. However, other embodiments are feasible in which the tab portion reaches to both ends of the tubular portion 24 of the casing tube 22.

Preferably, but not necessarily, along the length of the tab portion 26 the circumference of the fluid tube 10 is approximately completely surrounded by the by the tubular portion 24 and the tab portion 26 of the casing tube 22 which nestle to the fluid tube 10 in order to maximize the heated surface of the fluid tube 10. Alternatively, the tab portion 26 may be shorter in circumferential direction of the fluid tube 10 so that an increased gap remains between the longitudinal edge of the tab portion 26 wrapped around the fluid tube 10 and the tubular portion 24. In another alternative embodiment, the longitudinal edge of the tab portion 26 may touch the tubular portion 24 so that the fluid tube 10 is completely surrounded by the casing tube 22.

The fluid tube preferably is made from stainless steel which has a very high durability and a high strength. The profiled casing tube 22 preferably is an extruded aluminum profile because aluminum has an excellent thermal conductivity and simultaneously a good workability. Furthermore, the casing tube 22. However, other materials such as copper or a wide variety of metal alloys or even non-metallic materials such as a high-temperature plastic, for example, can be used for the fluid tube 22 or the casing tube 10, respectively, if advantageous for a certain application. Furthermore, a fluid tube can be used having an outer wall made of a material with good thermal conductivity and a thin inner coating made of a special material advantageous in view of the fluid to be heated.

Figure 3:
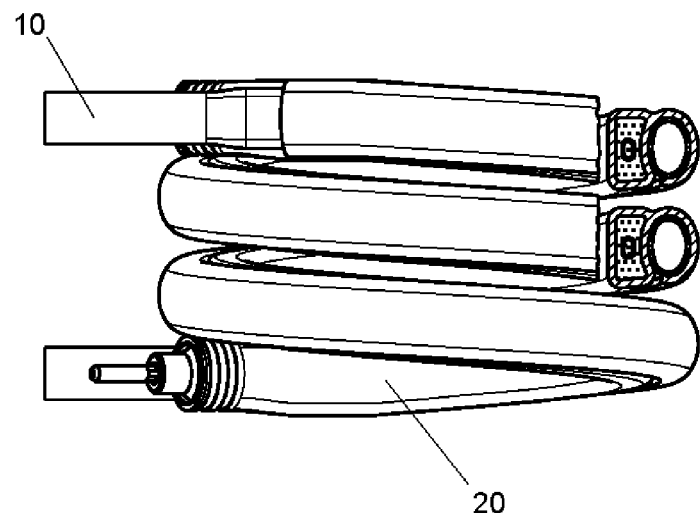
FIG. 3 is a side view of a helical assembly of a fluid tube and a tubular heating element according to a second embodiment of the present invention.
Figure 4:
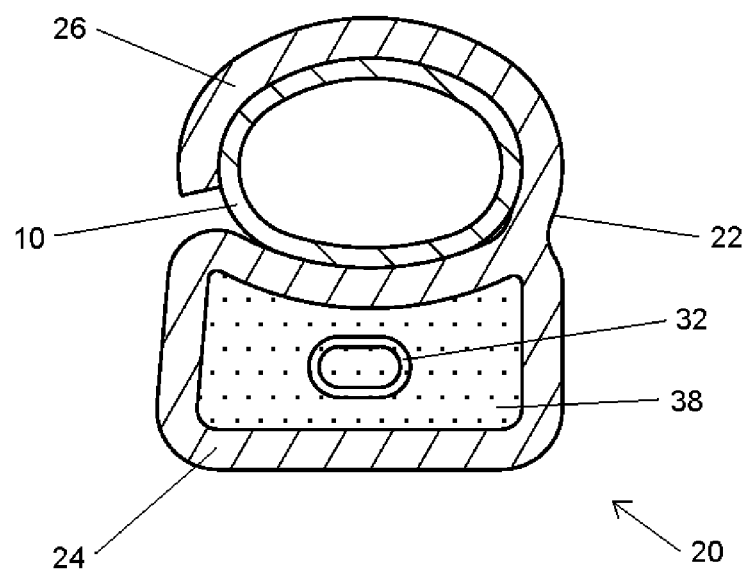
FIG. 4 shows a cross-section of the assembly of the fluid tube and the tubular heating element according to the second embodiment of the present invention.
Figure 5:
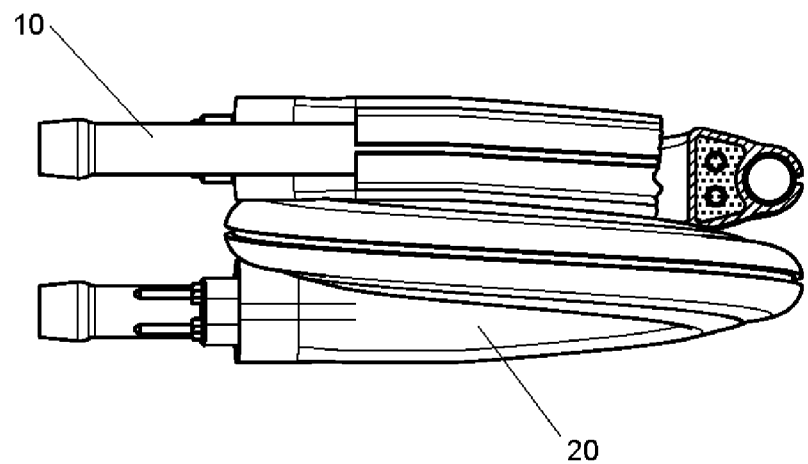
FIG. 5 is a side view of a helical assembly of a fluid tube and a tubular heating element according to a third embodiment of the present invention.
Figure 12:
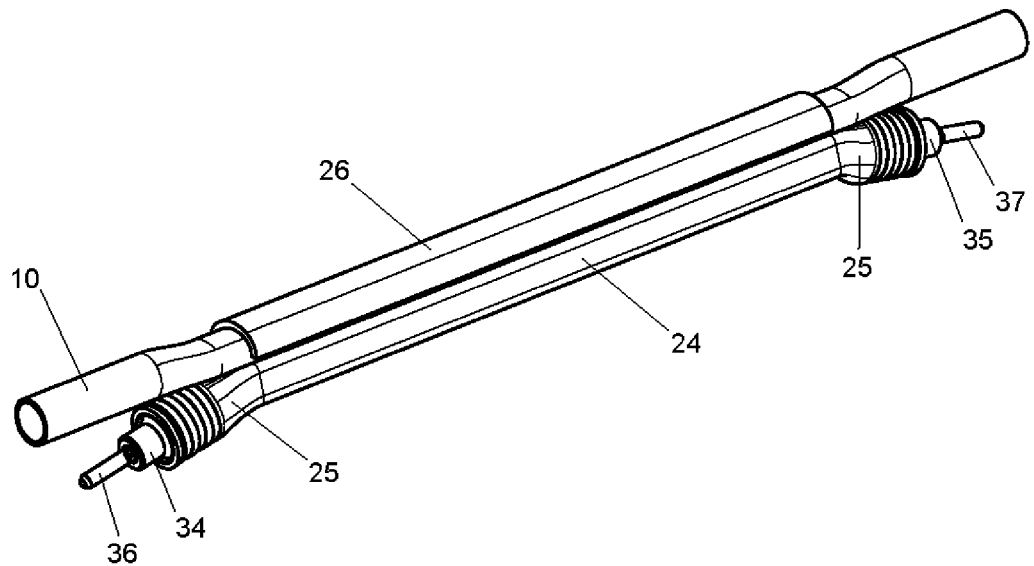
FIG. 12 is a perspective view of an assembly of the fluid tube and the tubular heating element according to the second embodiment of the present invention before bending it to a helical shape.

In the embodiment shown in FIGS. 1, 2, and the fluid tube 10 has a circular cross section. Alternatively, other cross sections of the fluid tube 10 are possible and may have additional advantages. For example, an elliptical cross section of the fluid tube 10 as shown in FIGS. 3, 4 and 12 may be used in a flow through heater according to a second embodiment of the invention. An elliptical cross section results in a higher ratio of heated surface to flow cross section which may be preferred for certain applications.

An assembly of a second embodiment of the helical flow through heater device of the invention having an elliptical fluid tube is illustrated in FIGS. 3, 4 and 12. For this embodiment, a profiled casing tube 22 similar to that shown in FIG. 7 can be used.

Figure 6:
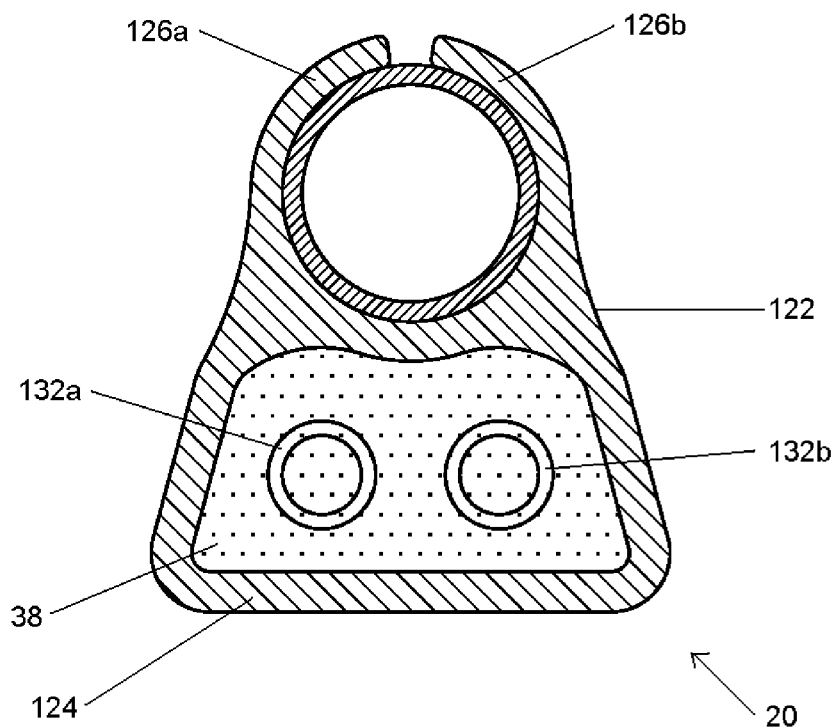
FIG. 6 shows a cross-section of the assembly of the fluid tube and the tubular heating element according to the third embodiment of the present invention.
Figure 13:
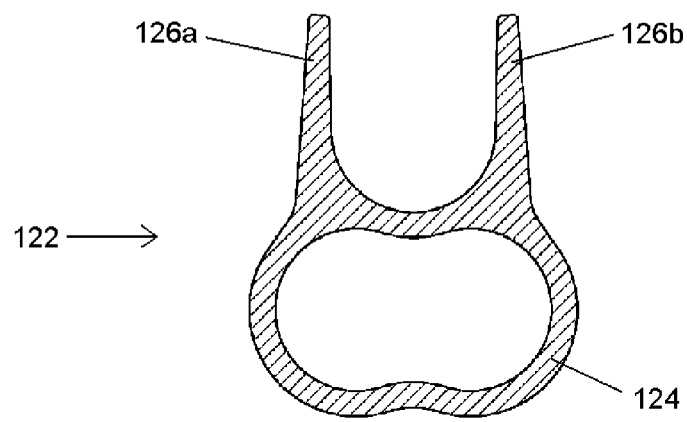
FIG. 13 shows a cross-section of a profiled casing tube of the tubular heating element according to a third embodiment of the present invention.
Figure 14:
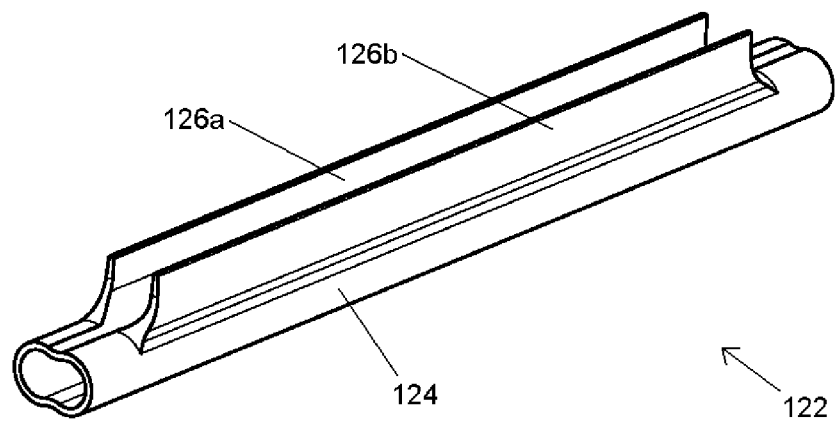
FIG. 14 is a perspective view of the profiled casing tube of FIG. 13.
Figure 15:
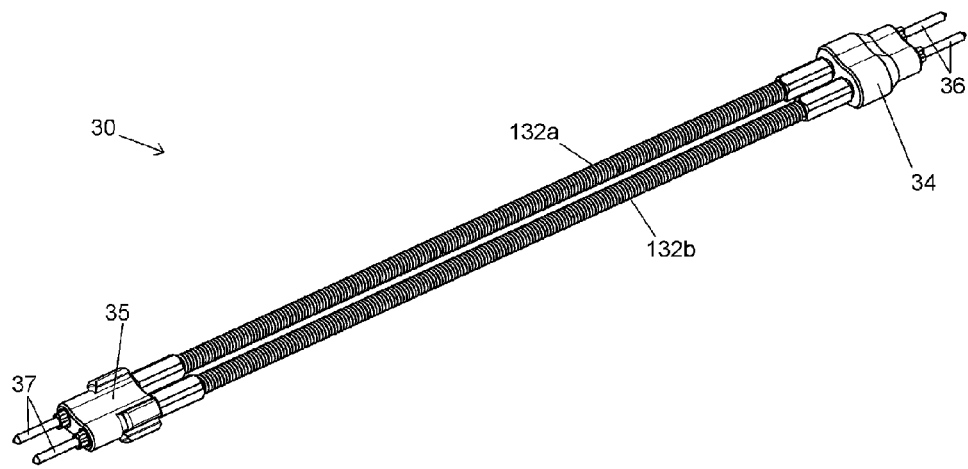
FIG. 15 is a perspective view of a heating unit to be mounted in a profiled casing tube according to the third embodiment of the present invention.
Figure 16:
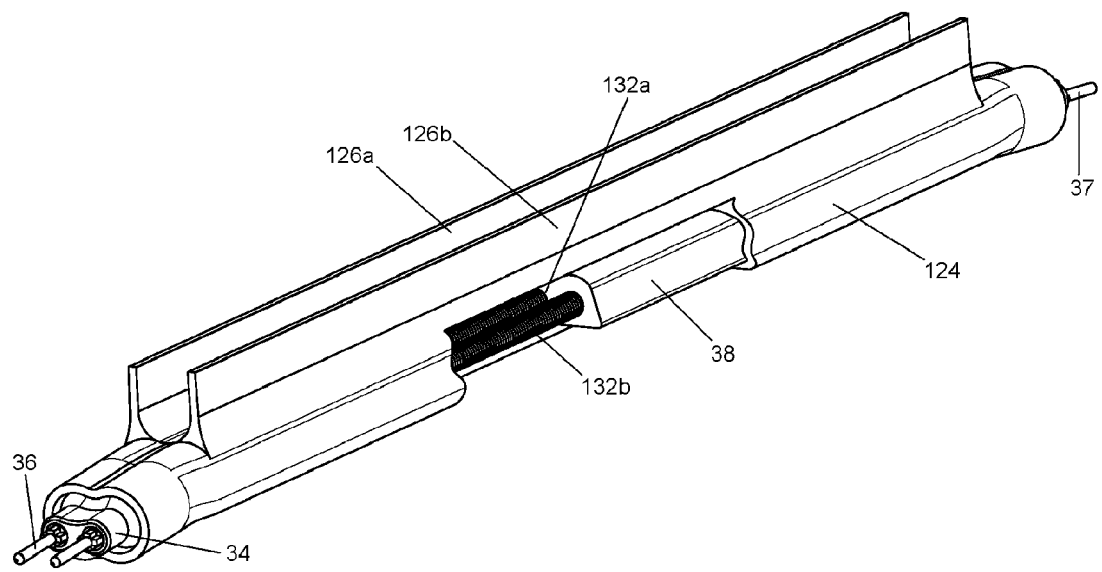
FIG. 16 is a perspective view of a pre-mounted tubular heating element according to the third embodiment of the invention, shown with the casing tube partially cut open.
Figure 17:
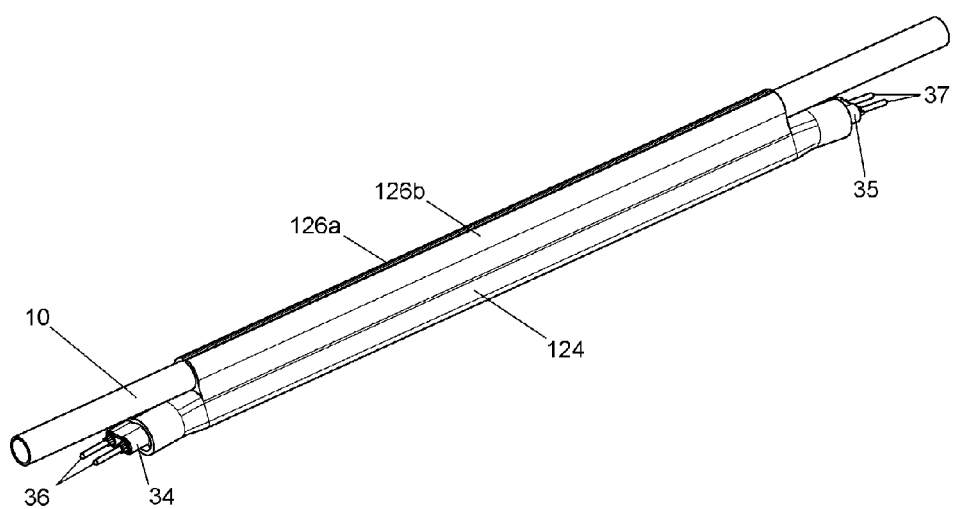
FIG. 17 is a perspective view of an assembly of the fluid tube and the tubular heating element according to the third embodiment of the present invention before bending it to a helical shape.

A further independent and advantageous development of the invention is a third embodiment shown in FIGS. 5, 6 and 13 to 17. A profiled casing tube 122 of the third embodiment is shown in FIG. 13 and comprises two tab portions 126a, 126b laterally protruding from the tubular portion 124 of the casing tube 122. The two tab portions 126a, 126b may be symmetric so that the edges of the same face to each other at a position of the fluid tube opposite to the tubular portion 124, as shown in FIG. 6, so that the circumference of the fluid tube 110 is approximately completely surrounded by the tubular portion 124 and the two tab portions 126a, 126b. However, other designs of the tab portions are also feasible, such as tab portions 126a, 126b having different lengths from their roots at the tubular portion 124 to their edges. Furthermore, the edges of the tab portions 126a, 126b shown in FIG. 6 may optionally touch each other, or may leave a greater slit exposing a greater circumferential portion of the fluid tube, if desired.

The profiled casing tube 122 of the third embodiment furthermore comprises a tubular portion 124 having a somewhat elongated cross section to receive a heating unit having two parallel heating coils 132*a*, 132*b* as shown in FIG. 6. Arranging two heating coils in the casing tube of the tubular heating element is a feature completely independent from the above mentioned feature of providing two tab portions, even though both features are illustrated in one embodiment shown in FIGS. 5, 6 and 13 to 17. In a further alternative option (not shown), the two heating coils 132*a*, 132*b* may be arranged coaxial to each other so that one heating coil is arranged within the other. Another alternative embodiment of the invention (not shown) may comprise a profiled casing tube having two adjacent tubular portions each receiving a separate heating coil, and two tab portions wrapped around a fluid tube. Providing two heating coils, which may have the same or a different electrical power, results in the advantage that the heating power can be controlled by repeatedly switching on and off only one of the heating coils, while the other heating coil is continuously in operation, or not. This reduces the repeatedly switched power, and thus, reduces noise sent back into the power network and flicker problems resulting from a high switched power and the power network impedance.

Figure 18:
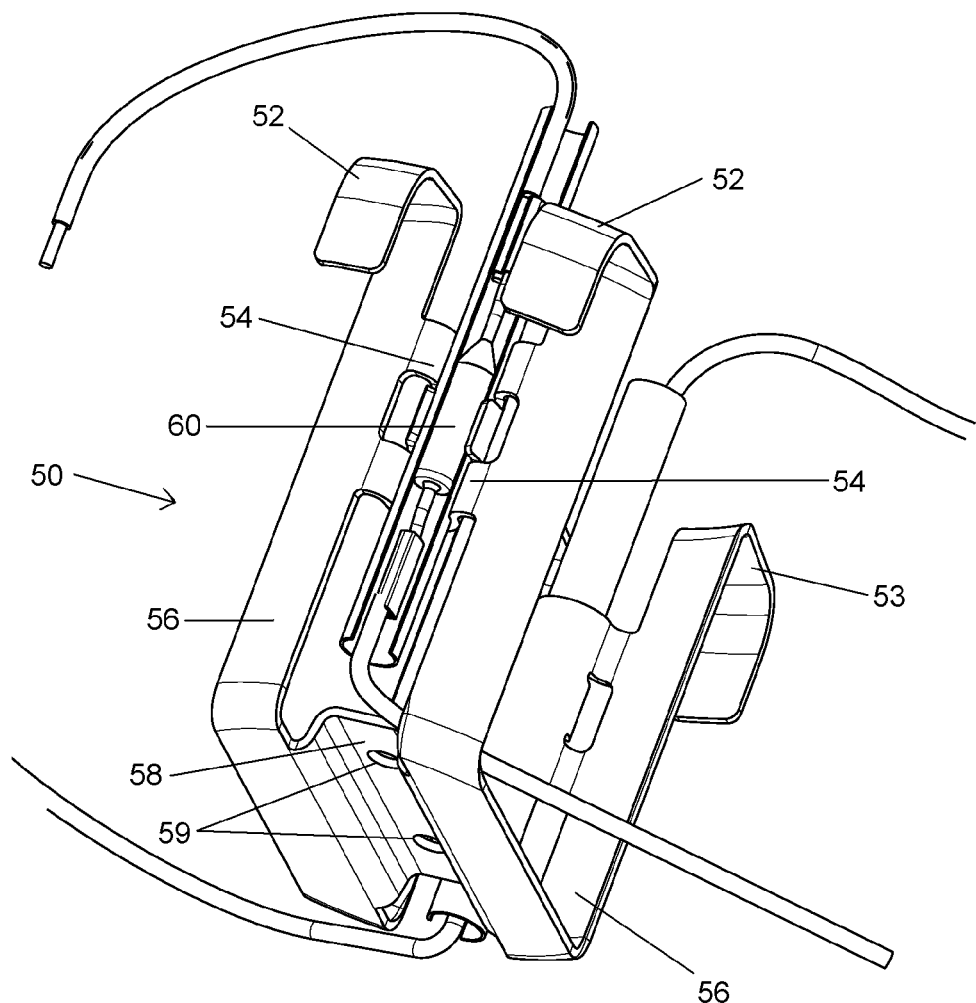
FIG. 18 is a perspective view of a mounting bracket according to the present invention adapted to hold a helical flow through heater device.

FIG. 18 is a perspective view showing a mounting bracket 50 for mounting a helical dynamic flow through heater in a beverage preparation apparatus such as a coffee machine, for example. The mounting bracket 50 is a completely independent device and is not restricted to be combined with the flow through heater of the invention, but may be used for mounting any flow through heater device having an approximately helical shape, even though it is described in the following in connection with an embodiment of the flow through heater of the present invention.

The mounting bracket 50 is preferably made of metal such as cold rolled mild steel, for example, and comprises at least one U-shaped strip 56 to be arranged inside the windings of the helical flow through heater device such that both legs of the U-shaped strip 56 are adjacent to the inner side of the helix. As shown in FIG. 18, a preferred embodiment of the mounting bracket 50 has two parallel U-shaped strips. The legs have hook-like end portions 52, 53 which encompass and clamp (hold) a winding of the helical heater device. The end portions 52, 53 may be different so as to be adapted to the inclination of the helix winding to be hold. A base 58 is connecting the two legs U-shaped strips and may provide means such as holes 59 for mounting the bracket 50 to a casing or a base plate of a beverage preparation apparatus by means of bolts (not shown), for example.

In a preferred embodiment, the mounting bracket 50 further comprises at least one holder 54 arranged at a leg of a U-shaped strip 56. The holder 54 may connect two adjacent U-shaped strips 56, as shown in FIG. 18. Moreover, the holder 54 holds a thermal safety device 60 such as a thermal fuse so that the thermal safety device 60 abuts on or is at least in heat-conductive connection with the inner side of the helical assembly of the flow through heater device. The mounting bracket preferably is formed such that the thermal safety device 60 is pressed resiliently against the heater device. The thermal safety device 60 being in thermal contact with the tubular portion 24 of the tubular heating element 20 serves to interrupt the electric heating circuit in case of overheating.

The mounting bracket 50 of the present invention enables a simple and fast mounting of the helical heater device, and simultaneously enables simple and correct placement of a thermal safety device 60 associated to the helical heater device with a reliable thermal contact. To this purpose, the thermal safety device 60 preferably is pre-mounted to the mounting bracket 50, before joining the mounting bracket 50 and the helical heater device and mounting the whole assembly in a casing, for example.

In the following, a method of producing a helical dynamic flow through heater device according to the present invention will be described with respect to the first embodiment of the flow through heater shown in FIGS. 1, 2 and 7 to 11.

In a first step, the profiled casing tube 22 is prepared, preferably by extruding an aluminum profile having the desired cross section with a tubular portion 24 and a tab portion 26, as shown and described above with respect to FIG. 7.

Then, in a second step, a pre-assembled heating unit 30 (shown in FIG. 9) is placed and mounted within the tubular portion 24 of the profiled casing tube 22. The heating unit 30 comprises at least one heating coil 32 and two insulating beads 34, 35 placed at the end portions 25 of the tubular portion 24. The insulating beads 34, 35 comprise connection terminals 36, 37 holding respective ends of the at least one heating coil 32. One insulating bead 34 has a circumferential shape corresponding to the (preferably circular) inner contour of the tubular portion 24. The other insulating bead 35 has a circumferential shape leaving voids when inserted in the tubular portion 24. The beads 34, 35 are fixed in the end portions 25 by press forming the end portions 25 around the beads 34, 35 so that the heating coil 32 is freely suspended within the tubular portion 24.

Optionally, the tab portion 26 may be removed from the end portions 25 of the tubular portion 24 before the second step in order to facilitate the press forming performed in the second step.

In a third step, a heat-conductive insulation material 38, such as a siliconized magnesium oxide powder, is filled into the volume defined within the tubular portion 24 between the two insulating beads 34, 35 via the voids left by the bead 35, as mentioned above. Then the voids a closed, for example by means of a resin, so that the heat-conductive material 38 is sealed within the tubular portion 24 and surrounds and pervades the heating coil 32.

A prepared tubular heating element 20 after the fourth manufacturing step is shown in FIG. 10 in a perspective view with the casing tube partially cut open.

In the fourth step, the tubular portion 24, in particular the middle portion situated between the end portions 25 of the tubular portion 24, is formed by press forming to reduce the cross sectional area of the inside volume of the tubular portion 24. Thereby, the heat-conductive insulation material 38 residing in the tubular portion 24 is compacted to improve heat conductivity from the heating coil 32 to the casing tube 22. Furthermore, in this forming step the tubular portion 24 is provided with a desired outer contour which on the one hand facilitates bending of the casing tube in a later step, and on the other hand provides adjacent to the tab portion 26 a circumferential contour portion 28 which is approximately complementary to the outer contour of the fluid tube 10.

Optionally, before or during the forming of the above described fourth step, the end portions 25 of the tubular portion 24 with removed tab portion 26 are bent so that their axial lines deviate from the axial line of the remaining middle section of the tubular portion 24. This facilitates assembling the tubular heating element 20 with the fluid tub 10, and furthermore improves accessibility of the end portions of the fluid tube 10 and the tubular portion 24 for mounting connection pieces as shown in FIG. 19.

In a fifth step, the fluid tube 10 is joined to the prepared tubular heating element 20 by nestling it to the complementary contour portion 28 of the tubular portion 24 adjacent to the tab portion 26 of the formed casing tube 22.

Then, in a sixth step, the tubular portion 26 is wrapped around the fluid tube 10 by a forming operation to approximately completely surround the circumference of the fluid tube 10 by the formed casing tube 22. The assembly of the fluid tube 10 and the formed casing tube 22 (or the formed tubular heating element 20, respectively) resulting from the sixth step is shown in FIG. 11.

A seventh step comprises bending the assembly of FIG. 11 to an approximately helical shape. Thereby, the assembly is bent in a direction within the plane spanned by the parallel center lines of the fluid tube 10 and the tubular portion 24 so that the tubular portion 24 of the casing tube 22 is positioned at the radial inner side of the helix, while the fluid tube is positioned at a radial outer side of the helix.

A helical flow through heater device resulting from the seventh step is shown in FIG. 1. This device may then be equipped with connection pieces, thermal safety devices and so on, as shown in FIG. 19, before being mounted in a casing of a beverage preparation apparatus by means of the mounting bracket 50, for example.

In order to improve heat transfer from the tubular heating element 20 to the fluid tube 10, before the fifth step of joining, heat-conductive means may optionally be applied onto the outer surface of the fluid tube 10 and/or the corresponding surface portions of the casing tube 22 intended to be in thermal contact with the fluid tube.

The heat-conductive means may comprise a heat-conductive paste, or preferably a solder applied together with a soldering flux. In this preferred case, the method of the invention further comprises an eighth step of applying heat to the assembly of the fluid tube 10 and the casing tube 22 so as to create a soldered connection between them, which is in particular preferred because it provides for an excellent heat transfer and a reliable connection of the components.

According to another further developed embodiment of the method of the invention, a soldered connection between the fluid tube 10 and the casing tube 22 is provided by applying a soldering flux onto the outer surface portions of the fluid tube 10 and the casing tube 22 intended to be soldered to each other, before joining them, and then, after the seventh step of bending, soldering the fluid tube 10 and the casing tube 22 by applying heat to the helical assembly and supplying solder via the slit remaining between the edge of the tab portion 26 and the tubular portion 24 of the casing tube 22, which slit enables access to the fluid tube 10.

FIGS. 13 to 17 correspond to FIGS. 7 to 8 and illustrate production of the helical dynamic flow through heater device of the third embodiment of the present invention according to the above described method steps.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A flow through heater device, comprising:
   a fluid tube carrying a fluid to be heated;
   a tubular heating element extending at least partially parallel and in thermal contact with the fluid tube;
   wherein the tubular heating element comprises a profiled casing tube and at least one heating coil mounted in a tubular portion of said profiled casing tube;
   wherein the profiled casing tube further comprises at least one tab portion laterally protruding from the tubular portion and being wrapped around the fluid tube such that at least one gap is provided in the profiled casing tube around the fluid tube; and
   wherein the assembly of the fluid tube and the tubular heating element has an approximately helical shape so that the tubular portion of the casing tube is positioned with respect to the helix radially inside of the fluid tube.

2. The device according to claim 1, wherein the fluid tube has a non-circular cross-section, in particular an elliptical cross-section.

3. The device according to claim 1, wherein a heat-conductive means is arranged between the fluid tube and the casing tube).

4. The device according to claim 3, wherein the heat-conductive means comprises a solder providing a soldered connection between the fluid tube and the casing tube.

5. The device according to claim 1, wherein the tubular portion comprises end portions protruding the tab portion in a longitudinal direction of the casing tube.

6. The device according to claim 1, wherein the circumference of the fluid tube is approximately completely surrounded by the casing tube.

7. The device according to claim 1, wherein the profiled casing tube comprises an extruded aluminum profile and the fluid tube comprises a stainless steel tube.

8. The device according to claim 1, further comprising:
   a U-shaped mounting bracket arranged inside the helical assembly of the fluid tube and the tubular heating element and having hook-like end portions holding at least one winding of the helical assembly for mounting the device in an apparatus, in particular in a beverage preparation apparatus such as a coffee machine;
   wherein the mounting bracket further comprises at least one holder holding a thermal safety device so that it abuts on the radial inner side of the helical assembly of the fluid tube and the tubular heating element.

9. A beverage preparation apparatus comprising a flow through heater device according to claim 1.

10. A method of producing a flow through heater device, comprising the steps of:
    preparing a profiled casing tube, in particular an extruded aluminum profile, having a tubular portion and at least one tap portion laterally protruding from the tubular portion;
    placing within the tubular portion of the casing tube a heating unit comprising at least one heating coil and two insulating beads holding respective ends of the at least one heating coil;
    filling a heat-conductive insulation material, in particular a siliconized magnesium oxide powder, into the inside volume of the tubular portion between the insulating beads;

forming the tubular portion to reduce the cross-sectional area of its inside volume and compact the heat-conductive insulation material, and further to provide the tubular portion adjacent to the at least one tab portion with an outer contour which in part is approximately complementary to the outer contour of a fluid tube provided for carrying a fluid to be heated;

joining the fluid tube to the approximately complementary contour of the formed tubular portion adjacent to the at least one tab portion of the casing tube;

wrapping the at least one tab portion around the fluid tube to approximately completely surround the circumference of the fluid tube; and bending the assembly of the formed casing tube and the fluid tube to an approximately helical shape so that the tubular portion of the casing tube is positioned with respect to the helix radially inside of the fluid tube.

11. The method according to claim 10, further comprising removing the tab portion at both end portions of the profiled casing tube.

12. The method according to claim 11, further comprising bending the end portions of the profiled casing tube so that their axes deviate from the axis of the remaining casing tube.

13. The method according to claim 10, further comprising applying heat-conductive means onto the outer surface of the fluid tube or the corresponding surface of the casing tube.

14. The method according to claim 13, wherein the heat-conductive means comprise a solder applied together with a soldering flux, and wherein the method further comprises soldering the fluid tube and the casing tube after the bending step by applying heat to the assembly of the casing tube and the fluid tube.

15. The method according to claim 10, further comprising:

applying a soldering flux onto the outer surface of the fluid tube or the corresponding surface of the casing tube; and soldering the fluid tube and the casing tube after the bending step by applying heat to the assembly of the casing tube and the fluid tube and supplying solder to a slit remaining between the tab portion and the tubular portion of the casing tube.

* * * * *

UNITED STATES PATENT AND TRADEMARK OFFICE
CERTIFICATE OF CORRECTION

PATENT NO. : 9,648,983 B2  
APPLICATION NO. : 14/401479  
DATED : May 16, 2017  
INVENTOR(S) : Johann Höfer et al.

Page 1 of 1

It is certified that error appears in the above-identified patent and that said Letters Patent is hereby corrected as shown below:

In the Claims

Column 14, Line 25:
"casing tube)." should read, --casing tube.--.

Signed and Sealed this  
Thirty-first Day of October, 2017

Joseph Matal
*Performing the Functions and Duties of the*
*Under Secretary of Commerce for Intellectual Property and*
*Director of the United States Patent and Trademark Office*